United States Patent
Gorski et al.

(10) Patent No.: US 6,555,588 B2
(45) Date of Patent: Apr. 29, 2003

(54) METHOD FOR THE PRODUCTION OF A POLYPROPYLENE BLEND

(75) Inventors: Guido Gorski, Kurten (DE); Andreas Thiele, Aachen (DE)

(73) Assignee: Der Grune Punkt - Duales System Deutschland AG (DE)

( * ) Notice: Subject to any disclaimer, the term of this patent is extended or adjusted under 35 U.S.C. 154(b) by 0 days.

(21) Appl. No.: 10/015,595

(22) Filed: Dec. 17, 2001

(65) Prior Publication Data

US 2002/0128394 A1 Sep. 12, 2002

(30) Foreign Application Priority Data

Dec. 15, 2000 (DE) .......................................... 100 62 710

(51) Int. Cl.⁷ ............................. C08J 11/08; C08L 23/12
(52) U.S. Cl. ..................... 521/40.5; 521/42; 521/42.5; 521/43; 521/43.5; 521/44; 521/44.5; 521/47; 525/192; 525/194; 525/240
(58) Field of Search ................................. 525/192, 194, 525/240; 521/40.5, 42, 42.5, 43, 43.5, 44, 44.5, 47

(56) References Cited

U.S. PATENT DOCUMENTS 6,329,436 B1 * 12/2001 Jody et al. ..................... 521/40

FOREIGN PATENT DOCUMENTS

| DE | 198 60 355 | 8/1999 |
|----|-----------|--------|
| WO | WO 96/20819 | 7/1996 |
| WO | WO 98/18607 | 5/1998 |
| WO | WO 99/36180 | 7/1999 |
| WO | WO 00/77082 | 12/2000 |

* cited by examiner

Primary Examiner—Nathan M. Nutter
(74) Attorney, Agent, or Firm—Aslan Baghdadi; Shaw Pittman LLP

(57) ABSTRACT

A method for producing a polypropylene blend from a plastic packaging materials containing high molecular weight polypropylene, other high molecular weight polymers such as polyethylene, low molecular weight polymers and other contaminants. The method includes extraction, solid-liquid separation and liquid-liquid phase separation using various organic solvents. The polypropylene blend has a purity of 95% and has favorable melt flow characteristics, while retaining satisfactory mechanical properties.

20 Claims, 1 Drawing Sheet

METHOD FOR THE PRODUCTION OF A POLYPROPYLENE BLEND

BACKGROUND

1. Field of the Invention

The invention concerns a method by which a polypropylene blend is produced by processing a plastic mixture that is composed of polypropylene and other high molecular weight polymers and which is contaminated with low molecular weight polymers and other impurities. Additionally, the invention concerns a polypropylene blend with specific characteristics produced in accordance with the method.

In this case, "high molecular weight polymers" include such polymers having a molecular weight over approximately 10000, for example, polyvinyl chloride, polystyrene, polyethylene terephthalate, polypropylene and polyethylene such as, for example, LDPE (low density polyethylene), LLDPE (linear low density polyethylene), MDPE (medium density polyethylene), HDPE (high density polyethylene) UHDPE (ultra high density polyethylene) with corresponding degree of polymerization.

In contrast, "low molecular weight polymers" include such polymers having a molecular weight of up to approximately 5000, for example, waxes or other degraded high molecular weight polymers.

The plastic mixture may also contain polyester.

2. Background of the Invention

During the introduction of the Dual System in Germany, while implementing the packaging regulation, the proper recycling of the collected plastics posed a particular challenge. An entirely new fraction, namely the plastics composites, was introduced on the market. Special recycling methods must be found for the heterogeneity and varying composition of the composite plastics. Raw material recycling is principally appropriate for this purpose. Since the plastics, within the framework of the Dual System, are collected in conjunction with a range of interfering materials, methods have been developed that reduce the separation expense to a justifiable level, but that also ensure a specific degree of purity of the plastics material. The methods described in international patent application nos. WO 96/20819 and WO 99/36180 are examples of dry process methods for the generation of composite plastic agglomerate. The method in accordance with international patent application no. WO 98/18607 is also successful when polyolefin is extracted using, among other things, sink-float separation.

After all, the objective is to separate the composite plastics into specific types of polymers and to employ them in making new products. In this regard, a method is suggested in international patent application no. WO 00/77082 A1, which was published after the priority date of the present application, by which a polyolefin plastic fraction is brought into contact with a solvent and the temperature of the solvent and, as the case may be, also the ratio of solvent to the quantity of plastic is adjusted in such a manner that as many of the polymer types as possible are dissolved. In a subsequent solid-liquid separation, one polymer type is precipitated from the solution using shearing. PP (polypropylene), LDPE (low density polyethylene), HDPE (high density polyethylene) could, in particular, be separated in conjunction with a thermal separation method, for example, in accordance with German patent application no. DE 198 06 355 A1, in which two liquid phases are produced, one of which is solvent rich and a second is polymer rich.

The content of waxes, additives, decomposition products and other impurities interferes during further recycling, particularly when these polyolefins are intended for use as new products. German patent application no. DE 100 62 437.5 which shares the same priority date, suggests a method by which the plastic mixture is introduced into an organic solvent in which at least one of the high molecular weight polymers is soluble at a specific temperature. In this case, in the presence of the employed organic solvent, the specific temperature can be defined as the dissolving temperature at which at least one of the polymers contained in the plastic mixture will be present in dissolved form by more than 10–50% by weight. In the method, the solvent at normal pressure is maintained at an operating temperature at which none of the high molecular weight polymers is dissolved and whereby a specific weight ratio of plastic mixture to solvent is adjusted. During a certain residence period, the low molecular weight components are extracted and, if necessary, the plastic mixture could then be removed from the solvent.

Each of international patent application nos. WO 96/20819, WO 99/36180, WO 98/18607 and WO 00/77082 A1 and German patent application nos. DE 198 06 355 A1 and DE 100 62 437.5 is incorporated by reference as if fully set forth herein.

SUMMARY OF THE INVENTION

Surprisingly, it was determined that products with excellent material characteristics could be generated if, initially at temperatures lower than the dissolving temperature, the plastic mixtures are freed from soluble components using solid-liquid extraction (SLE) and only afterwards are dissolved as well as subjected to subsequent separation steps. This would be particularly successful if the plastic mixture is available in pellet form.

By "pellets" is meant granulate or agglomerate which could be produced using the above mentioned dry and wet processing methods. Granulate and in particular agglomerate are characterized by high porosity or, as the case may be, by having surface fissures so that the extraction of low molecular weight polymers and other contaminants, surprisingly, is achieved with a satisfactory level of purity. Depending on the composition of the starting material, plastics blends are generated which are intended to be used together with new materials or as a replacement for new materials.

Of the plastics blends, the polypropylene blend is of particular interest.

Polypropylene is a part-crystalline material in which the crystalline share is between 50 to 70% depending on the production conditions. In this manner, isotactic, atactic and semi-tactic polypropylene is produced during propylene homopolymerization. The higher isotactic, or as the case may be, higher crystalline homopolymers can be subjected to heavy-duty mechanical pressure, are temperature stable and have low impact strength at low temperatures. The production processes may be differentiated based upon the different catalyst systems that are used for polymerization. Accordingly, a distinction is made between Ziegler-Natta and metallocene polypropylenes. Furthermore, different methods exist according to which block and random copolymers could be produced.

In Dr. Ing. Bodo Carlowitz's manual "Kunststofftabellen" [Plastics Tables], Hanser Publishing House, 4th edition, pp.

33 to 47, the common polypropylene characteristics are described. It reveals that the melt flow index MFR (measured at 230° C. with a load of 2.16 kg in accordance with ISO 1133) of the polypropylene produced in accordance with the above method, is in the range of 0.2 to 50 g/10 min. With an increasing MFR value, the tensile strength of each polypropylene type decreases significantly so that the yield stress lies between 30 and 34 N/mm$^2$ for a higher isotactical homopolypropylene at a density of 0.906 to 0.910 g/cm$^3$ with a very high MFR value of 20 to 40 g/10 min.

The processing of polypropylene usually occurs using injection molding. To achieve faster cycle times but still maintain polypropylene injection molded parts with good constant mechanical characteristics, it is desirable to generate a polypropylene from plastic packaging materials that flows easily and which has mechanical characteristics which are as good as a polypropylene that flows less easily.

Therefore, it is the object of the invention to make available a method with which a polypropylene blend with a defined composition and a purity of more than 95% can be produced from mixed plastic packaging materials that as opposed to a new product has the advantage in the processing that it flows easily while retaining satisfactory mechanical characteristics.

These objectives are solved by the method in accordance with the invention and a polypropylene blend produced in accordance with the method of the invention.

The method in accordance with the invention is characterized by the introduction of the plastic mixture into an organic solvent in which at least one high molecular weight polymer from the plastic mixture is soluble at a temperature specific for the polymer;

the maintaining of the solvent under normal pressure at an operating temperature at which no high molecular weight polymer is dissolved and adjusting the weight ratio of plastic waste mixture to solvent;

the extraction of low molecular weight components during a particular residence period of the plastic waste mixture in the solvent;

the dissolving of the plastic waste mixture already freed from low molecular weight components and the execution of a solid-liquid separation (SLS) for the removal of insoluble components such as paper, aluminum and other polymers depending on the type of solvent;

dissolving and phase separation, in other words, taking advantage of the presence of at least two liquid phases for the separation of different polymer compositions into fractions; and dissolving and selective precipitation of the polypropylene fraction using shearing or flow;

degassing of the polypropylene fraction; and granulation of the polypropylene fraction for the polypropylene blend.

This sequence of steps ensures that the polypropylene is made available in the desired purity.

DETAILED DESCRIPTION OF THE INVENTION

Figure 1:
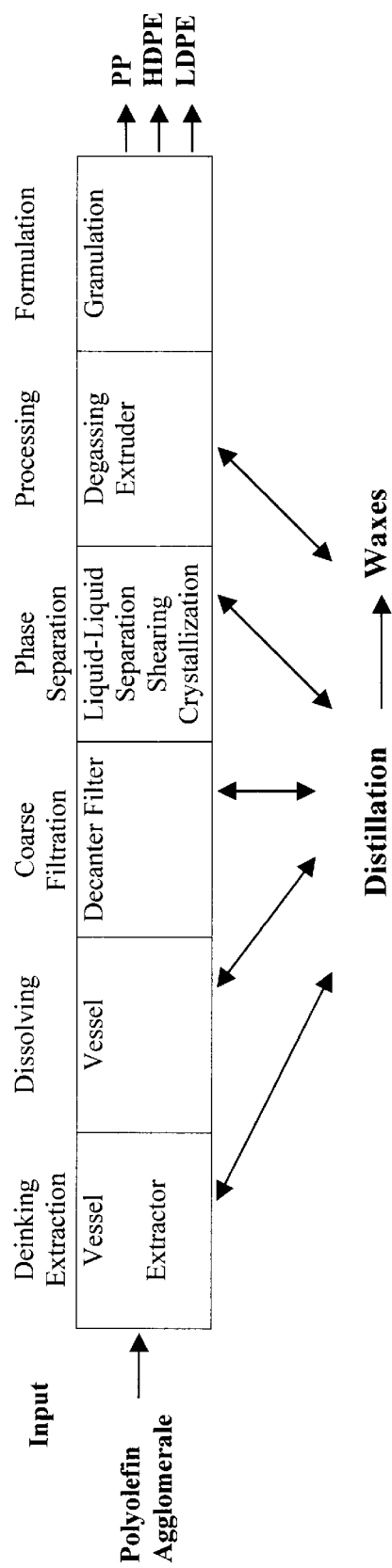
FIG. 1 is a schematic representation of the method in accordance with the present invention.

The invention is described in further detail below, as well as in the drawing and in the examples.

During the separation steps it is, for example, taken advantage of, as described in DE 198 06 355 A1, that during the dissolving of a plastic mixture in an organic solvent under certain conditions, lack of miscibility results and two liquid phases are generated which could be further treated separately. Selective precipitation can occur from a liquid phase using shearing or flow or by adding a precipitation chemical. This separation method can be executed either alone or in combination with the liquid-liquid phase separation. As an additional separation method, a selective dissolving in solvent could be considered which could also be executed either alone or in combination with precipitation using shearing or flow or by addition of a precipitation chemical. The combination of the selective dissolving in solvent and the liquid-liquid phase separation can also be executed alone or in combination with the above described precipitation method.

In this manner, the provision for the removal of the solvent after the extraction step and the addition of fresh solvent, either chemically identical or not identical is made possible for the subsequent separation into polymer fractions.

Solvents that can be used in the method of the invention include aliphatic, aromatic or cyclical, saturated or unsaturated hydrocarbons, alcohols, carboxylic acids, amines, esters, ketones, tetrahydrofurane, bimethyl formamide, dimethyl sulphoxide, N-methyl pyrrolidone or their mixtures.

It is particularly preferable to use hexane or octane as the solvent.

Preferably, the solvent is introduced to the process, and when a critical concentration of low molecular weight polymers in the solvent has been reached, the solvent is removed and can be cleaned using distillation. It is then returned as fresh solvent for the extraction.

The concentration of plastic waste mixture in the solvent could be 10 to 20% by weight, depending on the composition of the plastic waste mixture and the type of solvent.

Preferably, the operating temperature is maintained in the area of 60° C. to 70° C. The residence time should be between 60 to 90 minutes to remove approximately 80% of the waxes.

FIG. 1 shows a schematic representation of the method execution. The composite plastics pellets, which for example consist of polypropylene and polyethylene, are introduced into the solvent, which for example could be hexane, in a certain weight ratio. When stirred, a weak relative motion of the pellets to solvent is achieved. It is preferable in the course of this that the solvent temperature will be adjusted to between 60 and 70° C., preferably 65° C. After a residence period of approximately 70 to 90 minutes, the extracted composite plastics pellets are removed, and without removing the solvent, are dissolved for further processing in a solvent vessel which also contains hexane.

Subsequently, insoluble components such as paper or aluminum and other polymers that are not soluble in hexane are removed in a decanter which operates as a filter. Then, the separation of the polymer mixture using liquid-liquid phase separation and shearing crystallization as described in WO 00/77082 occurs. Each PP, HDPE and LDPE fraction is then separately degassed in an extruder and finally formulated. The polypropylene fraction treated in this manner forms the polypropylene blend in accordance with the present invention.

EXAMPLES

Example 1

In the table below, the characteristics of a polypropylene blend produced in accordance with the invention are summarized.

| Property | Standard/Procedure | PP blend produced according to method of the invention | |
|---|---|---|---|
| | | Average value | Standard Deviation |
| Yield stress (Mpa) | ISO 527 | 32.8 | 1.8 |
| Stretching elongation (%) | ISO 527 | 8.3 | 0.8 |
| Elongation at break (%) | ISO 527 | 86.2 | 24.3 |
| Tensile modulus of elasticity (Mpa) | ISO 527 | 1.403 | 133 |
| Impact strength 23 +/− 5° C. (kJ/m$^2$) | ISO 179 | 3.9 | 0.1 |
| Melt flow index MFR 230° C./2.16 kg (g/10 min.) | ISO 1133 | 16.3 | 7.2 |
| Melting Point (° C.) | ISO 3146 | 163.2 | 1.4 |
| Oxidation Stability (min.) | DIN EN 728 | 12.8 | 6.3 |
| Molecular weight | | | |
| - Mw (g/mol) | GPC | 234,000 | 34,000 |
| - Mw/Mn (g/mol) | GPC | 5.5 | 0.8 |
| Polymer PP content (% by weight) | DSC | 95.8 | 1.4 |
| Polymer PE content (% by weight) | DSC | 4.2 | 1.4 |
| Wax content (% by weight) | Extraction | 2.4 | 1.1 |
| Calcined residue (% by weight) | ISO R 1270 | 0.09 | 0.09 |
| Chlorine content (total chlorine %) | | 0.01 | 0.00 |

Example 2

Comparative

A currently available method for recycling plastic packaging materials uses the beaker fraction following a float-sink separation and exclusively forms a polypropylene re-granulate that has poor characteristics compared with the new material. At a mfr 230° c./2.16 kg from 4 to 5 g/10 min., The tensile strength lies at 30 to 40 n/mm$^2$.

The invention characteristics disclosed in the description above as well as in the patent claims could be significant both individually and in any chosen combination for the implementation of the invention.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for producing a polypropylene blend from a plastic mixture comprising high molecular weight polypropylene, other high molecular weight polymers and low molecular weight polymers, the method comprising the steps of:

(a) combining the plastic mixture with a first solvent in which at least one of the high molecular weight polymers is soluble;

(b) maintaining the solvent at an operating temperature at which essentially no high molecular weight polymer is dissolved, and adjusting the weight ratio of plastic mixture to solvent;

(c) extracting the low molecular weight polymers from the plastic mixture during a residence period;

(d) dissolving the plastic mixture resulting from step (c) in a second solvent, which is the same as or different from the first solvent, and separating insoluble components from the solution by solid-liquid separation;

(e) generating at least two liquid phases having different polymer compositions, and selectively precipitating polypropylene from at least one liquid phase using shearing or flow to form a polypropylene fraction;

(f) degassing the polypropylene fraction; and (g) granulating the polypropylene fraction to form a polypropylene blend.

2. The method in accordance with claim 1, wherein prior to step b) at a temperature which is lower than the operating temperature, at least one of the polymers contained in the plastic mixture is dissolved and is separated from the remaining polymers and from at least a portion of soluble contaminants contained in the plastic mixture using one or more solid-liquid separation methods.

3. The method in accordance with claim 1, wherein, in steps (a) to (c), when the concentration of low molecular weight polymers in the solvent reaches a predetermined level, the solvent is removed from the process, cleaned through distillation, and reused for the extraction.

4. The method in accordance with claim 1, wherein the first and second solvents are independently selected from the group consisting of aliphatic, aromatic and cyclical hydrocarbons, saturated and unsaturated hydrocarbons, alcohols, carboxylic acids, amines, esters, ketones, tetrahydrofuran, dimethyl formamide, dimethyl sulphoxide, N-methyl pyrrolidone or mixtures thereof.

5. The method in accordance with claim 1, wherein the weight ratio of plastic mixture to solvent is 10 to 20%.

6. The method in accordance with claim 1, wherein the operating temperature in step (b) is 60° C. to 70° C.

7. The method in accordance with claim 1, wherein the residence period in step (c) is 60 to 90 minutes.

8. The method in accordance with claim 1, wherein the plastic mixture used in step (a) consists of pellets that are so fine they can be drizzled.

9. The method in accordance with claim 1, wherein the insoluble components that are separated in step (d) include one or more of paper, aluminum and polymers other than polypropylene.

10. The method in accordance with claim 1, wherein following step (d), the plastic mixture is dissolved in a third solvent, which is the same as or different from the second solvent, prior to the phase separation.

11. The method in accordance with claim 1, wherein the plastic mixture used in step (a) is derived from plastic packaging materials that have been collected for recycling.

12. The method in accordance with claim 1, wherein each of the high molecular weight polypropylene and other high molecular weight polymers has a weight average molecular weight of at least 10,000.

13. The method in accordance with claim 1, wherein the other high molecular weight polymers include one or more of polyvinyl chloride, polystyrene, polyethylene terephthalate, LDPE, LLDPE, MDPE, HDPE and UHDPE.

14. The method in accordance with claim 1, wherein the solid-liquid separation comprises one or more of filtering, decanting or centrifuging.

15. The method in accordance with claim 1, wherein the low molecular weight polymers have a weight average molecular weight of up to 5000.

16. A polypropylene blend produced by the method in accordance with claim 1, wherein the blend contains at least 95% by weight polypropylene.

17. The polypropylene blend in accordance with claim 16 having an average melt flow index measured in accordance with ISO 1133 at 230° C. and 2.16 kg load of 14.7 to 17.9 g/10 min.

18. The polypropylene blend in accordance with claim 17 having an average yield stress of 29.5 to 36.1 Mpa.

19. An injection molded part made from a polypropylene blend in accordance with claim 18.

20. A polypropylene blend which has been recovered from a plastic mixture comprising high molecular weight polypropylene, other high molecular weight polymers and low molecular weight polymers, wherein the recovery method comprises the steps of:

(a) extracting the low molecular weight polymers from the plastic mixture using a first solvent at a temperature at which essentially none of the high molecular weight polymers is dissolved;

(b) dissolving the plastic mixture resulting from step (a) in a second solvent, which is the same or different from the first solvent, and separating insoluble components from the resulting solution by solid-liquid separation;

(c) generating at least two liquid phases having different polymer compositions, and selectively precipitating polypropylene from at least one liquid phase using shearing or flow to form a polypropylene fraction;

and wherein the polypropylene blend contains at least 95% by weight polypropylene, an average melt flow index measured in accordance with ISO 1133 at 230° C. and 2.16 kg load of 14.7 to 17.9 g/10 min., and has an average yield stress of 29.5 to 36.1 Mpa.

* * * * *